Patented July 19, 1932

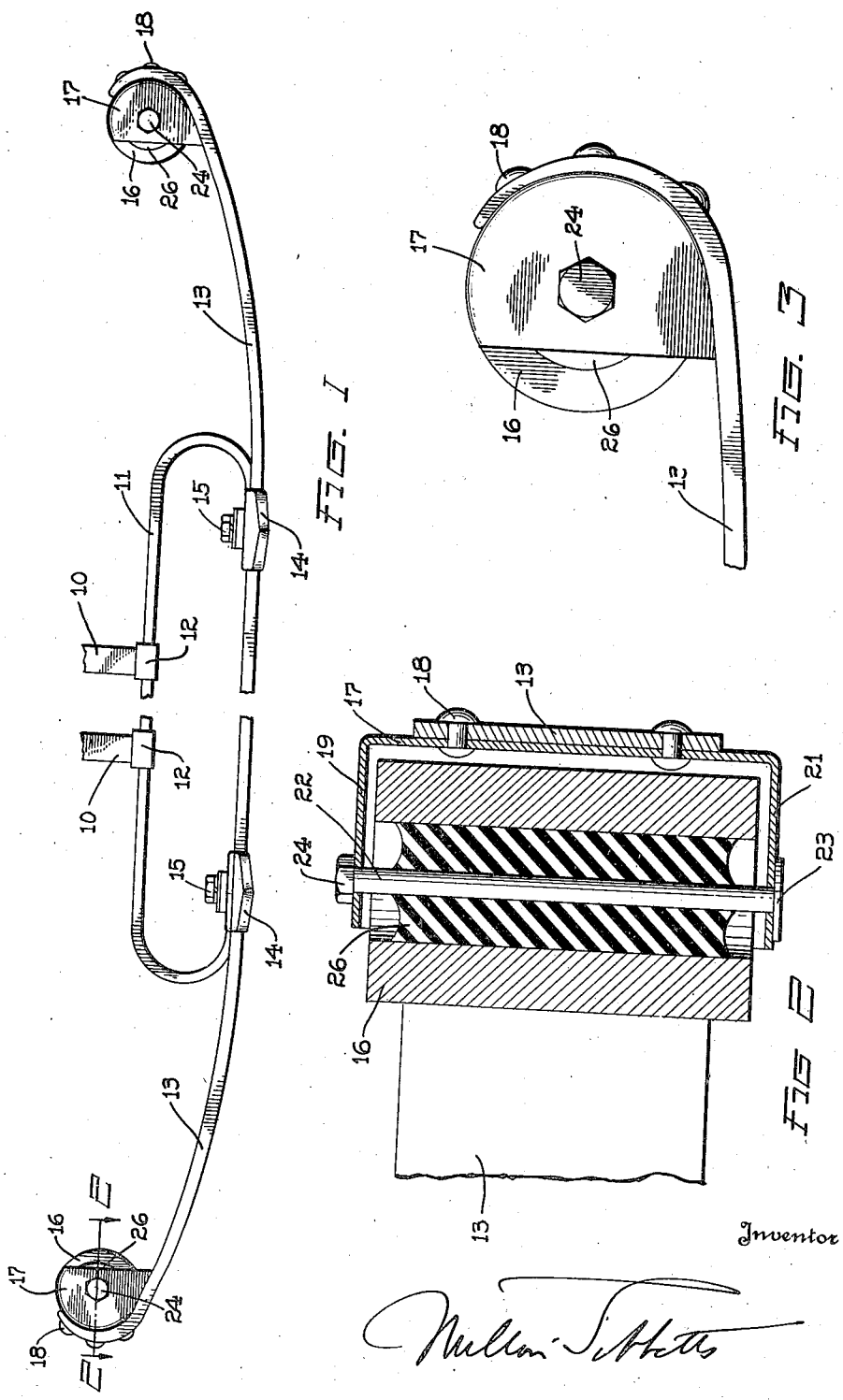

1,867,686

UNITED STATES PATENT OFFICE

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed October 31, 1931. Serial No. 572,426.

This invention relates to motor vehicles and more particularly to the elimination of the vibratory movements commonly termed road vibrations or shimmy.

It is an object of the invention to neutralize or absorb the energy tending to cause shimmy in an automobile by creating opposing forces of approximately the same magnitude.

It is another object of the invention to dampen vibration in a motor vehicle constituting a primary vibratory system by associating therewith a secondary vibratory system the vibrations of which oppose and neutralize the vibrations set up in the primary system due to road shocks.

A further object comprises the provision with those parts in an automobile which are subject to shimmy vibration, of resiliently supported masses which operate in sympathy and in opposite phase to the shimmy vibrations and which are designed to be of such proportions as to effectively absorb such vibrations at their inception.

Still another object of the invention resides in resiliently mounting a secondary vibration absorbing mass in rubber on the parts of a motor vehicle forming a primary vibratory system.

Other objects and advantages will become apparent to those skilled in the art from a reading of the description taken in connection with the accompanying drawing and in which:

Fig. 1 is a top plan view of a vehicle bumper construction embodying the features of the invention.

Fig. 2 is a sectional view taken substantially on the line 2—2 of Fig. 1, and looking in the direction indicated.

Fig. 3 is an enlarged plan view of an end of the bumper, showing the invention in connection therewith.

When road shock or vibration is transmitted to a vehicle there is set up a primary vibration system constituting the chassis, frame, body and other associated elements. The initial forces tending to cause shimmy are usually rather small but under certain conditions they build up to an extent where a noticeable shimmy and even a violent torsional vibration of the entire vehicle occurs. In accordance with the present invention, the effect of shimmy is substantially eliminated without adding materially to the weight of the automobile or to its cost of manufacture.

According to the present invention, there is provided a secondary vibration system which opposes the effect of vibrations induced into the primary vibratory system. In the secondary vibratory system, vibrations are created by energy transmitted from the primary system and which vibrations act in sympathy and in opposite phase with respect to the vibratory movements of the primary system. The secondary system is designed so that the vibrations occuring therein have a frequency and amplitude approximating those of the vibrations in the primary system thus effectively absorbing the energy transmitted from the primary system and dampening the primary oscillations. The frequency of the secondary vibrations may be equal to or less than the frequency of the primary vibrations and the amplitude of the secondary vibrations may be equal to or preferably somewhat greater than the vibrations of the primary system. Resilient, yieldable means are also provided for resisting the vibrations of the secondary system so that the energy tending to cause shimmy in the primary system is effectively dissipated.

Referring to the drawings, 10 indicates the parallel side members of a vehicle frame to the ends of which a bumper back bar 11 is secured by any suitable means such as by clips 12. The bumper back bar may be of any desired shape and as shown is curved at its ends to support an impact bar 13. The impact bar may be secured to the ends of the back bar 11 by any suitable means such as by clips 14 secured to the back bar and the impact bar by means of bolts 15.

Substantially all torsional vibrations or shimmy set up in the primary vibratory system are transmitted through the frame to the bumper assembly. To effectively dampen the vibrations set up in the primary vibratory system of which the impact bar 13 of the bumper is a part, a secondary vibratory system is mounted on the impact bar which is adapted to absorb and dissipate any vibrations transmitted thereto. As shown, this secondary vibratory system comprises a pair of weight members 16 carried by brackets 17 one of which is mounted on each end of the impact bar 13 and carried solely thereby. The brackets 17 are suitably secured to the impact bar 13 as by rivets 18 and are shaped to form housings which substantially conceal the weight members in either top or front view. The brackets 17 comprise a top flange 19, a bottom flange 21 and an interconnecting portion which may be partially circular in form. It is to be noted that the brackets or housings 17 are of one piece construction, thus providing a structure which is very economical to manufacture. A pin or bolt 22 having a head 23 is vertically disposed between the flanges of the bracket and is removably secured thereto by a nut 24. The weight members 16 are adapted to encircle the pins 22 between the flanges 19 and 21 of the bracket members and are provided with an enlarged vertically extending bore.

It is desirable that the weight members 16 be freely and entirely resiliently supported with respect to the impact bar so that relative movement may take place between the weights and the impact bar. In accordance with this invention, the weight members are supported on rubber mountings which in turn are secured to the pins 22 in the brackets 17. As shown, these mountings comprise a cylindrical piece of rubber 26 having an axial bore therethrough for the reception of the pins 22 and are adapted to be interposed between the peripheral surfaces of the shank portions of the pins 22 and the inner peripheral surfaces of the cylindrical weight portions 16. It is desirable that there be an effective surface union between the surfaces of the rubber members and those of the pins and the weights. In the preferred form of the invention, the desired surface union is preferably secured by vulcanizing the rubber members to the surfaces of the pins and to those of the weight members, but a surface union between these parts of sufficient strength may be secured by forcing a rubber cylinder into the axial bore of the weight portions, the rubber cylinder having a greater diameter than that of the bore. By so doing the rubber will be compressed radially and extended axially to take substantially the form shown and to frictionally engage the surfaces of the pins and the weights 16. It will be seen that the pins 22 are fixed relative to the brackets 17 but that the weights 16 are mounted for limited resilient movement with respect to the brackets. It will be further understood that the surfaces of the weights 16 will move vertically and axially relatively to the pin 22 and that by so doing, the rubber, which is interposed between these opposing surfaces and has a surface union therewith, will be placed in shear to yieldingly resist such movement. By reason of the fact that the rubber acts in shear, the weights 16 will be very sensitive to vibratory impulses imparted to them through the vibratory system.

The thickness and elastic properties of the rubber members 26 and the weight of the weight portions 16 are so proportioned that the natural period of vibration of the weights 16 is approximately equal to the period of shimmy vibration of the primary system, with the result that as soon as the primary system begins to shimmy, the weights 16 will begin to vibrate in sympathy therewith and in substantially opposite phase thereto and in a vertical direction, due to the relations of the natural vibrations of the two systems. The energy causing the vibrations of the weights 16 will be taken up or absorbed through the rubber mountings.

From the foregoing, it will be apparent that an efficient and inexpensive device has been provided whereby the vibrations set up in the parts of a vehicle forming a primary vibratory system are effectively dampened and dissipated so that little or no shimmy is apparent to an occupant of the vehicle. The device illustrated is very economical to manufacture both as regards the parts thereof and their assembly.

It will be appreciated that the constructions described and illustrated as the preferred form may be varied to a considerable extent without departing from the concept of the invention. For example, a sleeve member may be interposed between the surfaces of the pins 22 and those of the rubber inserts 26 having its ends in abutting relations with the inner surfaces of the flanged portions 19 and 21 of the brackets and having its outer peripheral surfaces bonded to the surfaces of the rubber. By such construction, the weight and rubber assembly may be accomplished separately from that of the bracket and would be easily removable therefrom. It will also be seen that the bracket members 17 may be formed to provide merely brackets, and need not be extended to form covers for the weights and the rubber portions, as shown.

It will be apparent to those skilled in the art that the invention as illustrated is susceptible of various other changes in construction and design without departing from the spirit or scope thereof, which is to be limited only by the appended claims.

Having thus described the invention, what is claimed and desired to be secured by Letters Patent is:

1. In a vehicle bumper structure, the combination of an impact bar, and a weight carried solely by the impact bar.

2. In a vehicle bumper structure having an impact bar, a resilient mounting carried solely by the impact bar, and a mass supported by the resilient mounting.

3. In a vehicle bumper structure having an impact bar, a resilient mounting carried solely by the impact bar, and a mass entirely supported by the resilient mounting.

4. In a vehicle bumper structure having an impact bar, a rubber mounting carried solely by the impact bar, and a weight suspended by the rubber mounting.

5. In a vehicle bumper structure having an impact bar, a rubber mounting carried solely by the impact bar, and a weight entirely suspended by the rubber mounting.

6. In a bumper structure having an impact bar, a rubber mounting carried solely by the impact bar, a weight suspended by the rubber mounting for movement relative to the impact bar, said rubber resisting movement of the weight by a shearing action of the rubber.

7. In a vehicle having parts forming a primary vibratory system, a secondary vibratory system comprising a pin mounted on one of the parts of the primary system, a vibration absorbing mass positioned adjacent the pin for movement relative thereto, and a resilient mounting interposed between the pin and the mass, said resilient mounting having a surface union with the pin and the mass to yieldingly secure them together, whereby the mass will be permitted to move relatively to the pin.

8. In a vehicle having parts forming a primary vibratory system, a secondary vibratory system comprising a pin mounted on one of the parts of the primary system, a vibration absorbing weight positioned adjacent the pin for movement relative thereto, and a rubber mounting interposed between the pin and the weight, said rubber mounting having a surface union with the pin and the weight to yieldingly secure them together, whereby the weight will be permitted to move relatively to the pin.

9. In a vehicle having a bumper forming a part of a primary vibratory system, a bracket on the bumper, a pin carried by the bracket, a rubber mounting secured to the pin and having a surface union therewith, and a vibratable mass secured to the rubber mounting, said rubber mounting resisting the vibratory movements of the mass through shearing action of the rubber.

10. In a bumper structure for vehicles, a one-piece bracket secured to a portion of the bumper, a rubber mounting supported by the bracket, and a weight supported by the rubber mounting, said bracket forming a one-piece cover partially concealing the weight and the rubber mounting in top view, and the bumper and bracket co-operating to substantially conceal the weight and the rubber mounting in front view.

11. In a bumper structure for vehicles, a one-piece bracket secured to a portion of the bumper, a rubber mounting carried by the bracket, and a weight supported by the bracket, said bracket forming a one-piece cover adapted to partially conceal the rubber mounting and the weight.

12. A vehicle structure comprising an impact bar, a rubber mounting secured to each end of the impact bar and carried solely thereby and a weight supported on each of the rubber mountings, said weights being vibratable in a vertical plane relative to the impact bar.

In testimony whereof I affix my signature.

MILTON TIBBETTS.